Figure 1:
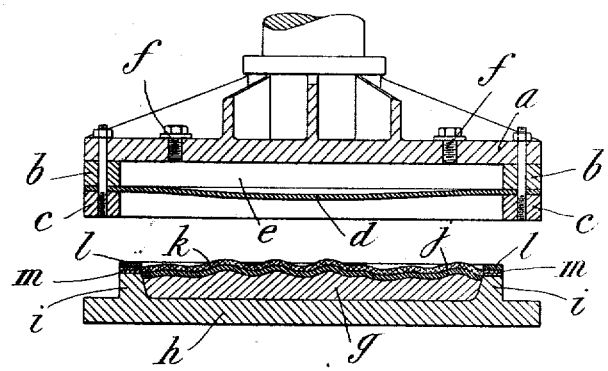

E. LANHOFFER.
APPARATUS FOR MOLDING OBJECTS BY PRESSURE.
APPLICATION FILED MAR. 28, 1913.

1,260,002.

Patented Mar. 19, 1918.

UNITED STATES PATENT OFFICE.

EDMOND LANHOFFER, OF POISSY, FRANCE.

APPARATUS FOR MOLDING OBJECTS BY PRESSURE.

1,260,002.   Specification of Letters Patent.   Patented Mar. 19, 1918.

Application filed March 28, 1913. Serial No. 757,408.

*To all whom it may concern:*

Be it known that I, EDMOND LANHOFFER, citizen of the Republic of France, and resident of No. 2 Boulevard de Maisons, Poissy, in the Department of Seine & Oise, in the said Republic, engineer, have invented a new and useful Apparatus for Molding Objects by Pressure, of which the following is a specification.

This invention relates to a method of and apparatus for molding objects by pressure, especially when such objects are produced from agglomerated fibrous materials.

A material capable of being molded and requiring for exact reproduction of the pattern, a compression more or less great usually necessitates the employment of a die or counter-matrix intended to distribute the pressure as uniformly as possible over the whole surface of the mold. Now the making of such a die capable of exactly displacing material so as to accurately reproduce the relief is very costly and almost impossible to make when patterns which are a little complicated are concerned.

Materials composed of fibers and of hydraulic agglomerants, in particular when that agglomerant is cement, have the disadvantage that they give up, even under a very small pressure, the excess of water which they contain and which excess of water renders them plastic or workable. It follows that the displacements of material which are necessary for the reproduction of the pattern are effected only with great difficulty, the pattern is not faithfully reproduced and the reproduction obtained possesses serious inequalities of compression for it becomes very hard and clear or sharp at the places where it has been strongly compressed and remains spongy and not clearly formed at the places where by reason of a deficiency of material, the compression and the distribution in the mold have been inadequate.

In the manufacture of plaques of cement and asbestos the material in question has been compressed between two plane surfaces in a hydraulic press. Experience shows however that even in this case where the displacements of material during pressure take place with least difficulty, it is impossible to obtain uniform compression of the material for all parts of the plaque. If instead of plane plaques, it is a question of plaques having reliefs more or less accentuated the thickness of the plaque is in itself unimportant but on the contrary uniform compression is essential in order that the product may possess in all parts the same hardness and the same clearness of reproduction.

According to the present invention, the difficulties have been overcome by replacing the rigid counter-matrix or die generally employed for the pressing operation by an elastic platen cushion which, by its own pliancy and the movement which it imparts to the material brings about the displacements of the latter and assures an almost uniform distribution of the pressure.

In order to enable the invention to be readily understood reference is made to the accompanying drawing in which two forms of apparatus are shown by way of example and in which:—

Figure 2:
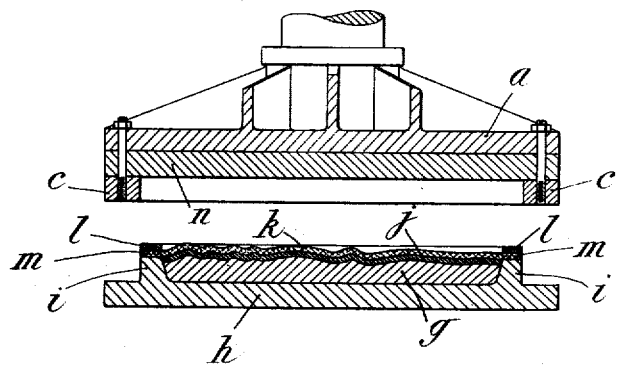

Figure 1 represents a vertical section of an apparatus comprising a liquid or fluid cushion and Fig. 2 represents a similar view of an apparatus comprising a solid elastic platen.

In carrying out the invention and referring to Fig. 1 the plate $a$ of a hydraulic or other press is furnished upon its lower surface with a frame or ring $b$ the height of which is greater than the height of the part having the greatest relief in the pattern to be reproduced. Upon this frame is fixed by means of a second frame or ring $c$ a sheet or diaphragm of rubber $d$. Between this sheet and the plate $a$ there is consequently a closed space $e$ which is filled with water through the openings $f$. The mold $g$ is arranged upon a table $h$ which is provided with a frame or flange $i$ which takes into the frame $c$ of the plate with the least possible play.

The material $j$ to be molded and pressed is placed upon the mold in as uniform a layer as possible and is compressed by means of the liquid cushion above described. The water contained in the space $e$ will be forced by the relief portions of the mold into the depressions thereof and thus the rubber will be forced into the crevices and hollows of the mold and will carry with it the material to be molded. As soon as the rubber becomes applied all over, the pressure will become uniformly distributed over all parts of the mold giving a uniform compression to the material and consequently a reproduction which will be uniformly sharp or clear all over.

For those materials which, under compression, give up the water or the air which they contain in excess in the preliminary stage, a felted and preferably loose or knitted fabric *k* is interposed between the material to be compressed and the sheet of rubber and extends to the edges of the frame *i* on the table. The part of the felt which comes upon this frame is covered by a steel frame *l* which has little projections *m* spaced apart from one another at a little distance and which prevent the sheet of rubber from compressing the felt at the parts which lie between the projections. The result therefore is that at these parts all the water and all the air which has passed from the material into the felt is able to escape to the exterior of the apparatus.

The laying of the material upon the mold is an operation which is rather long and demands much care; therefore it is advantageous, when the relief parts of the mold are not too considerable, to employ the material in the form of sheets obtained by any known process. Such sheets may be produced for example in machines such as are used for producing cardboard, pasteboard and paper sheets. The displacing power of the rubber and the fact that, according to the present method, the projecting parts are compressed first, permits of avoiding the tearing of the said sheets.

When the degree of relief is small the apparatus can be simplified and a simple sheet of rubber *n*, Fig. 2, can be employed. This rubber sheet preferably has a thickness several times as great as the height of that portion of the mold which is in strongest relief, and this sheet is fixed to the lower surface of the platen of the press.

If the sheet of rubber be made thicker, the final compression obtained will be more uniform. A sheet which is too thin would give on the contrary too great a pressure upon the projections and too small in the hollow portions of the mold.

It is easy to account for the work of extension which the rubber in this latter arrangement exerts upon the material. The projecting parts of the mold will be submitted first of all to the compression and the portions of the material at these points will be retained in place. At the same time the material will still be absolutely free in the hollows of the mold. Therefore there will be in the neighborhood of one another parts where the compression is already relatively strong and other parts where it is still absent. Now the rubber being in the same state of unequal compression, flows into the hollows and is subjected to the same effects of displacement as those which it is desired to produce in the material, which material will be displaced by the rubber in the same way as the latter. As the hollows become filled, the compression of the different parts will become more and more uniform, according to the degree of increase in the total pressure, the rubber contained in the hollows operating from this moment as the liquid contained in the space *e*, Fig. 1, described above.

What I claim is:—

1. A press of the character described, comprising a matrix, a support therefor, a frame on the support surrounding the matrix, a sheet of fabric covering the matrix and frame, a clamping ring fitted to engage the said frame and clamp the edges of the fabric thereto at intervals, a movable platen having a yielding cushion throughout its active face, and means for actuating the platen.

2. A press of the character described comprising a matrix table, a matrix thereon, a frame on said table and surrounding said matrix, a sheet of fabric covering said matrix and extending with its edge portions over said frame, clamping means coöperative with said frame to clamp said edge portions at intervals only, a platen, a movable support therefor, a yielding cushion secured to said platen, and a ring or frame secured to said platen over the edge portions of said cushion and adapted to take over the frame on said table when said platen is depressed substantially as set forth.

In testimony, that I claim the foregoing as my invention, I have signed my name in presence of two witnesses, this twelfth day of March, 1913.

EDMOND LANHOFFER.

Witnesses:
  LUCIEN MEMMINGER,
  ALCIDE FABE.